US012198854B2

(12) United States Patent
Tomita et al.

(10) Patent No.: US 12,198,854 B2
(45) Date of Patent: Jan. 14, 2025

(54) SOLENOID THAT DRIVES A SHAFT IN A DIRECTION ALONG A CENTRAL AXIS

(71) Applicant: DENSO CORPORATION, Kariya (JP)

(72) Inventors: Shodai Tomita, Kariya (JP); Kazuhiro Sasao, Kariya (JP); Masato Arai, Kariya (JP)

(73) Assignee: DENSO CORPORATION, Kariya (JP)

( * ) Notice: Subject to any disclaimer, the term of this patent is extended or adjusted under 35 U.S.C. 154(b) by 72 days.

(21) Appl. No.: 17/747,438

(22) Filed: May 18, 2022

(65) Prior Publication Data

US 2022/0375671 A1 Nov. 24, 2022

(30) Foreign Application Priority Data

May 20, 2021 (JP) ................................ 2021-085175

(51) Int. Cl.
*H01F 7/08* (2006.01)

(52) U.S. Cl.
CPC ....... *H01F 7/081* (2013.01); *H01F 2007/086* (2013.01)

(58) Field of Classification Search
CPC ...... H01F 7/081; H01F 7/16; H01F 2007/086; H01F 2007/083; H01F 2007/085; H01F 7/1607; F16K 31/0613; F16K 31/0675; F16K 31/06
USPC .......................................................... 335/299
See application file for complete search history.

(56) References Cited

U.S. PATENT DOCUMENTS

| | | | | |
|---|---|---|---|---|
| 2006/0243938 A1* | 11/2006 | Ishibashi | F16K 31/0613 | 251/129.15 |
| 2007/0194868 A1* | 8/2007 | Kurasawa | H01H 51/065 | 335/132 |
| 2009/0121817 A1* | 5/2009 | Ishibashi | F16K 31/0613 | 335/255 |
| 2010/0301978 A1* | 12/2010 | Ishibashi | H01F 7/1607 | 335/255 |

(Continued)

FOREIGN PATENT DOCUMENTS

| | | |
|---|---|---|
| JP | 2014-190447 | 10/2014 |
| JP | 2020-088144 | 6/2020 |

(Continued)

*Primary Examiner* — Shawki S Ismail
*Assistant Examiner* — Lisa N Homza
(74) *Attorney, Agent, or Firm* — Nixon & Vanderhye P.C.

(57) ABSTRACT

A solenoid driving a shaft in a direction along a central axis includes a coil that generates magnetic flux and a magnetic container that accommodates the coil. The container has a side surface portion and a bottom portion. A plunger arranged inside the coil and sliding in a direction along the central axis to move the shaft, and a stator core are provided. The stator core has a plunger accommodating portion and a shaft accommodating portion that accommodates the shaft and attracts the plunger. The plunger accommodating portion has a cylindrical core portion that accommodates the plunger inside, and a flange portion that is provided radially outward at an end of the core portion on the bottom portion side and is welded to the bottom portion of the container. A ring core provided on the opposite side of the shaft accommodating portion to the plunger accommodating portion is provided.

17 Claims, 11 Drawing Sheets

(56) References Cited

U.S. PATENT DOCUMENTS

| | | | | |
|---|---|---|---|---|
| 2011/0148555 | A1* | 6/2011 | Sasao | H01F 7/126<br>335/262 |
| 2012/0154079 | A1* | 6/2012 | Sasao | H01F 7/128<br>335/278 |
| 2014/0225690 | A1* | 8/2014 | Ando | H01F 7/1607<br>335/255 |
| 2020/0088309 | A1* | 3/2020 | Kono | F16F 1/047 |
| 2020/0089261 | A1* | 3/2020 | Kono | G05B 19/042 |
| 2020/0362980 | A1* | 11/2020 | Suzuki | H01F 7/1844 |
| 2021/0005369 | A1* | 1/2021 | Kashiwa | H01F 7/16 |
| 2021/0278007 | A1* | 9/2021 | Sasao | F16K 31/0675 |
| 2021/0278008 | A1* | 9/2021 | Sasao | F16K 31/0613 |
| 2021/0327626 | A1* | 10/2021 | Sasao | H01F 7/081 |

FOREIGN PATENT DOCUMENTS

| | | |
|---|---|---|
| JP | 2021-017942 | 2/2021 |
| JP | 2021-017943 | 2/2021 |
| JP | 2021-086926 | 6/2021 |

* cited by examiner

SOLENOID THAT DRIVES A SHAFT IN A DIRECTION ALONG A CENTRAL AXIS

CROSS REFERENCE TO RELATED APPLICATION

This application is based on Japanese patent application No. 2021-85175 filed on May 20, 2021, the entire content of which is incorporated herein by reference.

TECHNICAL FIELD

The present disclosure relates to a solenoid.

BACKGROUND

A solenoid has a yoke formed of a magnetic material, a coil arranged inside the yoke, a stator core formed of a magnetic material arranged inside the coil, and a plunger arranged inside the stator core.

SUMMARY

According to one embodiment of the present disclosure, a solenoid for driving the shaft in a direction along a central axis is provided. The solenoid includes a coil that generates magnetic flux and a magnetic container that accommodates the coil. The container has a side surface portion and a bottom portion, and the side surface portion and a part of the bottom portion act as a yoke through which the magnetic flux passes. Further, a plunger arranged inside the coil and sliding in a direction along the central axis to move the shaft, and a stator core formed of a magnetic material are provided. The stator core has a plunger accommodating portion and a shaft accommodating portion that accommodates the shaft and attracts the plunger by an action of the magnetic flux. The plunger accommodating portion has a cylindrical core portion that accommodates the plunger inside, and a flange portion that is provided radially outward at an end of the core portion on the bottom portion side and is welded to the bottom portion of the container. Further, a ring core provided on the opposite side of the shaft accommodating portion to the plunger accommodating portion is provided.

DETAILED DESCRIPTION

In an assumable example, a solenoid has a yoke formed of a magnetic material, a coil arranged inside the yoke, a stator core formed of a magnetic material arranged inside the coil, and a plunger arranged inside the stator core. The solenoid generates a magnetic force by energizing the coil and slides the plunger with respect to the stator core. In the solenoid, a ring core is provided on an outer periphery of the stator core, and the ring core is pressed against a bottom of the yoke by an elastic member provided in a space between the ring core and the yoke.

In such a solenoid, magnetic flux is less likely to pass through the space where the elastic member is arranged as compared with a bottom of the yoke, the ring core, and the stator core formed of the magnetic material. Therefore, it is difficult to increase a magnetic efficiency when sliding the plunger. Therefore, there is a demand for a configuration capable of increasing magnetic efficiency.

The present disclosure has been made to solve at least a part of the above problems, and can be implemented as the following embodiments.

According to one embodiment of the present disclosure, a solenoid for driving the shaft in a direction along a central axis is provided. The solenoid includes a coil that generates magnetic flux and a magnetic container that accommodates the coil. The container has a side surface portion and a bottom portion, and the side surface portion and a part of the bottom portion act as a yoke through which the magnetic flux passes. Further, a plunger arranged inside the coil and sliding in a direction along the central axis to move the shaft, and a stator core formed of a magnetic material are provided. The stator core has a plunger accommodating portion and a shaft accommodating portion that accommodates the shaft and attracts the plunger by an action of the magnetic flux. The plunger accommodating portion has a cylindrical core portion that accommodates the plunger inside, and a flange portion that is provided radially outward at an end of the core portion on the bottom portion side and is welded to the bottom portion of the container. Further, a ring core provided on the opposite side of the shaft accommodating portion to the plunger accommodating portion is provided.

According to the solenoid of this configuration, by welding the flange portion and the bottom portion, an elastic member that presses the flange portion to the bottom portion and a space in which the elastic member is arranged are not provided between the coil and the flange portion. Therefore, it is possible to increase the magnetic efficiency without making it difficult for the magnetic flux to pass through the space.

The present disclosure can be realized as the following embodiments. For example, the present disclosure can be realized in the embodiment of a solenoid valve, a method of manufacturing a solenoid, and the like.

First Embodiment

Figure 1:
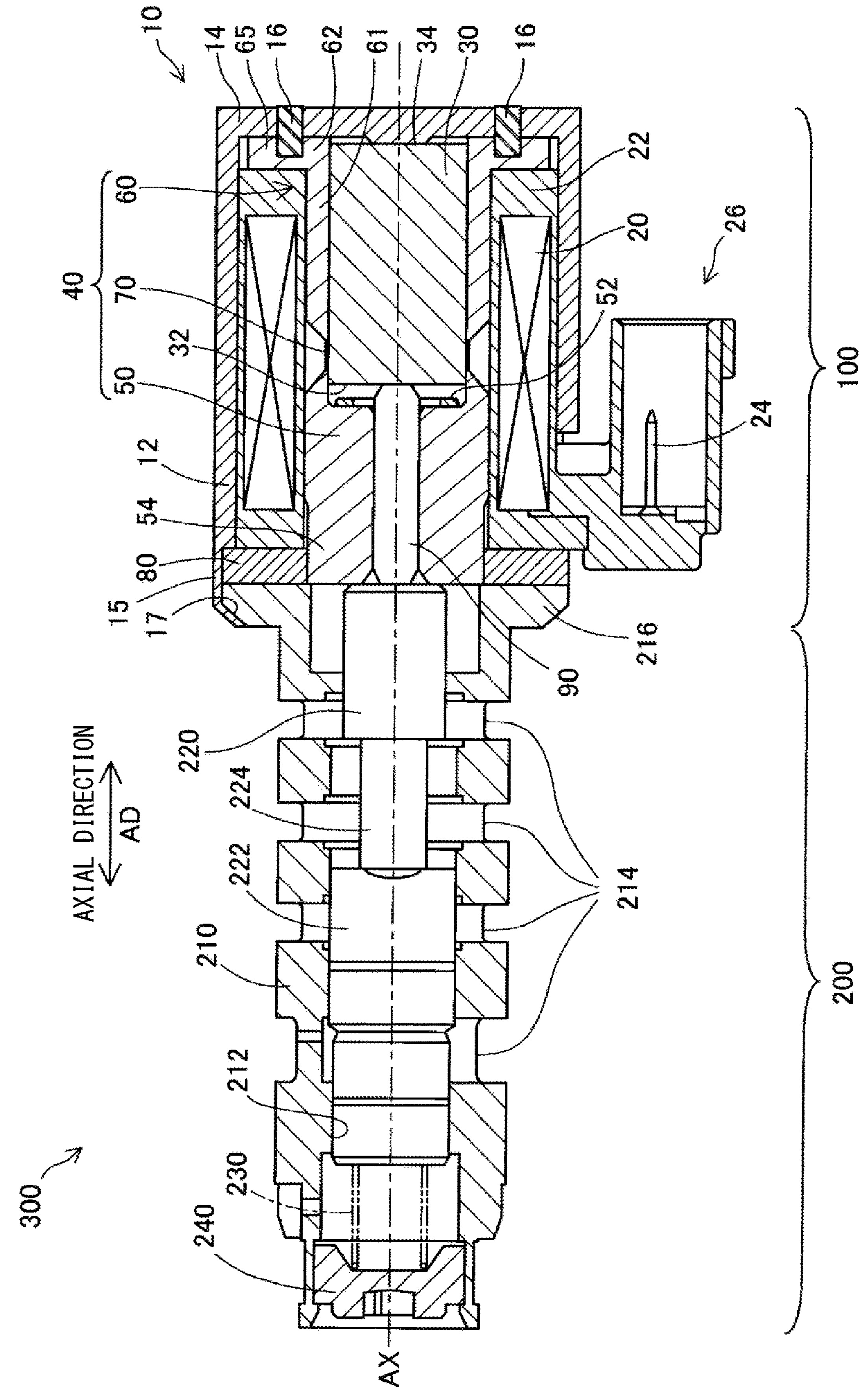
FIG. 1 is a sectional view showing a schematic configuration of a linear solenoid valve.

A linear solenoid valve 300 shown in FIG. 1 is, for example, a device used for controlling a hydraulic pressure of hydraulic oil supplied to an automatic transmission for a vehicle. The linear solenoid valve 300 includes a solenoid 100 and a spool valve 200. The solenoid 100 and the spool valve 200 are arranged along a central axis AX.

The spool valve 200 includes a sleeve 210, a spool 220, a spring 230, and an adjust screw 240. The solenoid 100 functions as an actuator for driving the spool 220 of the spool valve 200.

The sleeve 210 has a substantially cylindrical external shape. The sleeve 210 has an insertion hole 212 penetrating along a central axis AX, and a plurality of oil ports 214 communicating with the insertion hole 212 and opening in a radial direction. The spool 220 is inserted into the insertion hole 212. The plurality of oil ports 214 are formed on a side surface of the sleeve 210 side by side in the direction along the central axis AX. The plurality of oil ports 214 function, for example, as an input port that communicates with an oil pump (not shown) to receive oil supply, an output port that communicates with a clutch piston (not shown) to supply oil pressure, a drain port that discharges hydraulic oil, and the like. At the end of the sleeve 210 on the solenoid 100 side (a direction AE side), a flange portion 216 whose diameter increases toward the outside in the radial direction is formed. The flange portion 216 is fixed to each other with a container 10 of the solenoid 100 described later.

The spool 220 has a substantially rod-like external shape in which a plurality of large-diameter portions 222 and small-diameter portions 224 are arranged side by side along the central axis AX. The spool 220 slides along the central axis AX inside the insertion hole 212, and adjusts a communication state and an opening area of the plurality of oil ports 214 according to a position along the central axis AX between the large-diameter portion 222 and the small-diameter portion 224.

A shaft 90 for transmitting a thrust of the solenoid 100 to the spool 220 is arranged at the end of the spool 220 on the solenoid 100 side (the direction AE side). A spring 230 is arranged at the other end (the direction AD side) of the spool 220. The spring 230 is composed of a compression coil spring, and presses the spool 220 in the solenoid 100 direction (the direction AE side) along the central axis AX. As a result, the spool 220 comes into contact with the shaft 90. The adjust screw 240 is arranged in contact with the spring 230, and adjusts a spring load of the spring 230 by adjusting a screwing amount of the adjust screw 240 to the sleeve 210 so as to adjust a pressing force of the spool 220 in the solenoid 100 direction. The spool 220 is located at a position where the thrust of the solenoid 100 and the pressing force due to the spring load of the spring 230 are balanced.

Figure 2:
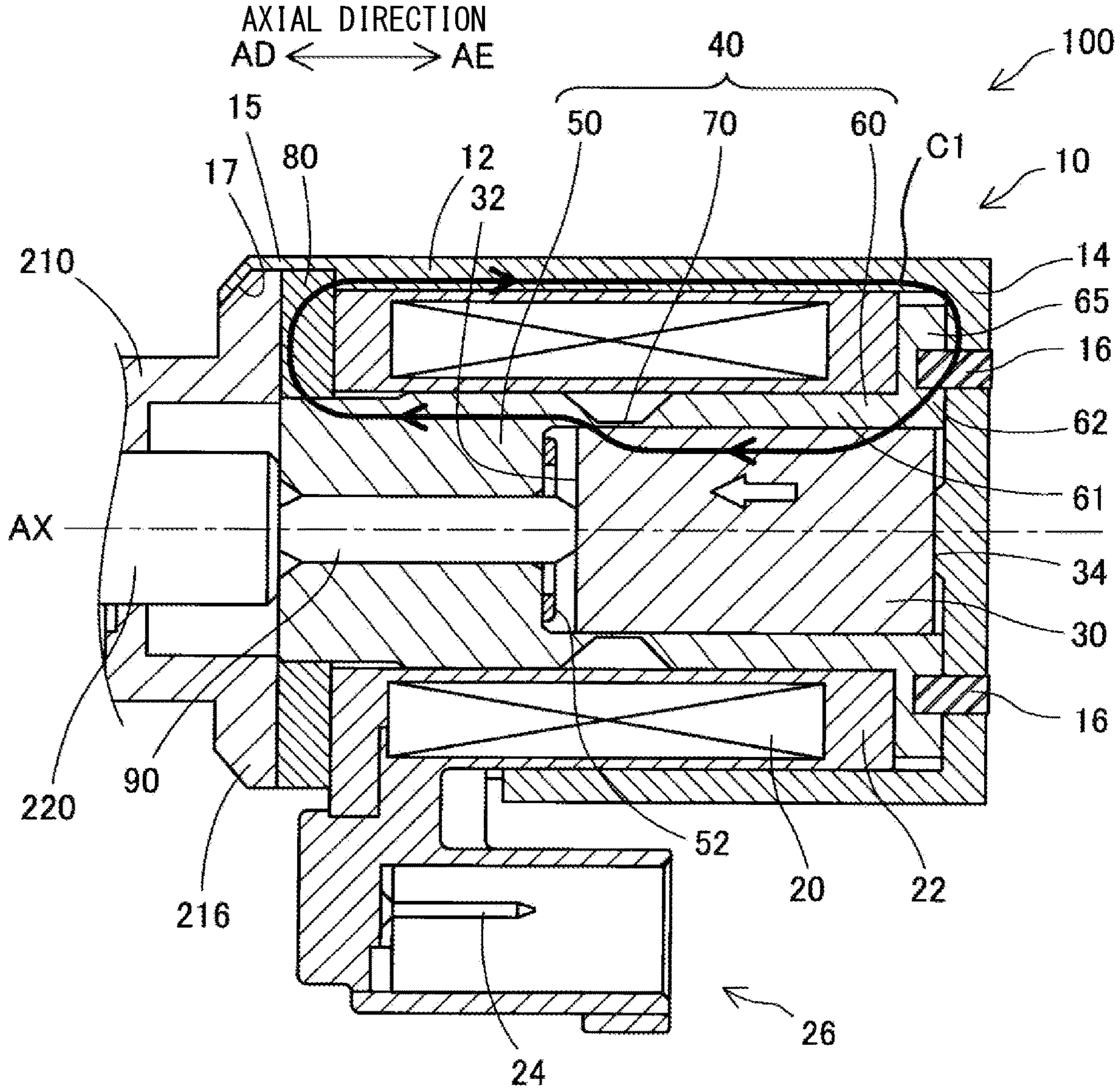
FIG. 2 is a sectional view showing a detailed configuration of a solenoid.

The solenoid 100 shown in FIGS. 1 and 2 includes a container 10, a coil 20, a plunger 30, a stator core 40, and a ring core 80. When the coil 20 is energized and controlled by an electronic control unit (not shown), in the solenoid 100, the plunger 30 moves by a magnetic flux generated by the coil 20. As the plunger 30 moves, the spool 220 of the spool valve 200 moves in a direction AD via the shaft 90 in contact with the plunger 30.

As shown in FIG. 2, the container 10 constitutes an outer shell of the solenoid 100. The container 10 is formed of a magnetic material such as iron and functions as a yoke. The container 10 includes a side surface portion 12, a bottom portion 14, and an opening portion 17. The side surface portion 12 has a substantially cylindrical appearance shape along the central axis AX. The bottom portion 14 closes an end of the side surface portion 12 at an end of the side surface portion 12 on a side (a direction AE side) opposite to the spool valve 200. An end of the side surface portion 12 on the spool valve 200 side (a direction AD side) is formed to be thin and configures a thin-walled portion 15. The opening portion 17 is formed in the thin-walled portion 15 at the end of the side surface portion 12 on the spool valve 200 side. After the components of the solenoid 100 are assembled inside the container 10, the opening portion 17 is caulked and fixed to a flange portion 216 of the spool valve 200. Instead of caulking, the spool valve 200 and the container 10 may be fixed by any method such as welding.

The coil 20, the stator core 40, and the plunger 30 are housed in the container 10. The coil 20 is arranged inside the side surface portion 12 of the container 10. The coil 20 is configured by winding a lead wire with an insulating coating around a resin bobbin 22 arranged inside the side surface portion 12 of the container 10. An end of the lead wire forming the coil 20 is connected to a connection terminal 24. The connection terminal 24 is arranged inside a connector 26. The connector 26 is arranged on the outer peripheral portion of the container 10 and electrically connects the solenoid 100 and the electronic control unit via a connection line (not shown).

The stator core 40 is arranged inside the coil 20. The stator core 40 is made of, for example, a magnetic material such as iron, and includes a thin-walled portion 70 formed by a recess on the outer periphery of a central portion along the axial direction AX. The starter core 40 has a shaft accommodating portion 50 in which a small-diameter hollow portion in which the shaft 90 is slidably accommodated is formed, and a plunger accommodating portion 60 in which a larger-diameter hollow portion in which the plunger 30 is slidably accommodated is formed. In the stator core 40, the shaft accommodating portion 50 and the plunger accommodating portion 60 are functionally separated by the thin-walled portion 70. The thin-walled portion 70 is formed on an outer periphery of the plunger accommodating portion 60, and acts as a magnetic flux passage suppressing portion that makes it difficult for magnetic flux to pass through. A wall thickness of the thin-walled portion 70 is extremely thin, about ¼ to ⅒, as compared with the wall thickness of the plunger accommodating portion 60. Therefore, as will be described later, the magnetic flux is suppressed from passing along the plunger accommodating portion 60, and a considerable part of the magnetic flux passes through the plunger 30 side. It is preferable to provide the thin-walled portion 70 because a considerable portion of the magnetic flux passes through the plunger 30 side, but the thin-walled portion 70 can be omitted.

A flange portion 65 protruding radially outward from the central axis AX is formed at the end of the plunger accommodating portion 60 on the bottom portion 14 side, and the stator core 40 is fixed to the bottom portion 14 by the flange portion 65. The fixed structure of the starter core 40 will be described in detail later. A part of the plunger accommodating portion 60 excluding the flange portion 65 is referred to as a core portion 61. The core portion 61 has a cylindrical shape having a hollow having an inner diameter larger than that of the shaft accommodating portion 50. The plunger 30 is inserted into the hollow of the core portion 61 with a slight sliding gap from an inner peripheral surface thereof. A stopper 52 is arranged on a surface of the shaft accommodating portion 50 facing the end surface (hereinafter, also referred to as "tip surface 32") of the plunger 30 on the spool valve 200 side. The stopper 52 is made of a non-magnetic material and suppresses a direct contact between the plunger 30 and the shaft accommodating portion 50, and suppresses the plunger 30 from becoming difficult to separate from the shaft accommodating portion 50 by magnetic attraction.

The flange portion 65 is a portion formed toward the outside in the radial direction over the entire circumference of the end portion 62 on the bottom portion 14 side of the plunger accommodating portion 60. The flange portion 65 is located between the bobbin 22 and the bottom portion 14 of the container 10. The flange portion 65 is welded to the bottom portion 14 of the container 10. The flange portion 65 transfers magnetic flux between the container 10 and the plunger 30 via the core portion 61. More specifically, the flange portion 65 transfers the magnetic flux between the bottom portion 14 of the container 10 and the plunger 30. The flange portion 65 may transfer magnetic flux between the side surface portion 12 of the container 10 and the plunger 30. In the present embodiment, a radial gap is provided between the flange portion 65 and the side surface portion 12 of the container 10 for easy assembly.

The plunger 30 has a substantially columnar appearance shape and is made of a magnetic material such as iron. As described above, since the plunger 30 is inserted into the hollow part of the core portion 61 with a slight sliding gap from the inner peripheral surface, the plunger 30 slides in the inner peripheral surface of the plunger accommodating portion 60 of the stator core 40 in the direction AD side or the direction AE side. The shaft 90 described above is arranged on a tip surface 32 of the plunger 30, and the shaft 90 is urged in the direction of the plunger 30 by the spring 230 and is in contact with the plunger 30. Further, the plunger 30 is urged toward the bottom portion 14 side of the container 10, that is, the direction AE side by the urging force of the spring 230 transmitted to the spool 220. The end surface (hereinafter, also referred to as "base end surface 34") opposite to the tip surface 32 faces the bottom portion 14 of the container 10. The plunger 30 is formed with an air vent hole (not shown) penetrating along the central axis AX. Such an air vent hole allows fluids located on the base end surface 34 side and the tip surface 32 side of the plunger 30, such as hydraulic oil and air, to pass through.

The thin-walled portion 70 is formed between the shaft accommodating portion 50 and the core portion 61 in the direction along the central axis AX. The thin-walled portion 70 suppresses the direct flow of magnetic flux between the core portion 61 and the shaft accommodating portion 50. In the present embodiment, the thin-walled portion 70 is configured such that the radial thickness of the stator core 40, which is a magnetic material, is formed to be thin, so that the magnetic resistance of the thin-walled portion 70 is larger than that of the shaft accommodating portion 50 and the core portion 61.

The ring core 80 is arranged between the coil 20 and the flange portion 216 of the spool valve 200 on the direction AD side of the coil 20. In other words, the ring core 80 is arranged at the end on the direction AD side of the shaft accommodating portion 50 of the stator core 40, which will be described later, and on the radial outside of the end portion (hereinafter, also referred to as "end portion 54") on the side opposite to the plunger 30 side. The ring core 80 has a ring-shaped appearance and is made of a magnetic material such as iron. The ring core 80 transfers magnetic flux between the shaft accommodating portion 50 of the stator core 40 and the side surface portion 12 of the container 10. The ring core 80 is configured to be displaceable in the radial direction. As a result, variations in the dimensions of the stator core 40 during manufacture and imperfect alignment of the stator core 40 during assembly are absorbed. In the present embodiment, the shaft accommodating portion 50 is fitted to the ring core 80 with a slight radial gap. The shaft accommodating portion 50 may be press-fitted into the ring core 80.

When the coil 20 is not energized, the plunger 30 is urged by the spring 230 via the shaft 90 and is in contact with the bottom portion 14 of the container 10. The coil 20 generates a magnetic force when energized, and as shown in FIG. 2, a loop-shaped magnetic flux flow (hereinafter, also referred to as "magnetic circuit C1") passing through the side surface portion 12 of the container 10, the bottom portion 14 of the container 10, the core portion 61 of the stator core 40, the plunger 30, and the ring core 80 is formed. At this time, the plunger 30 is magnetically attracted by the shaft accommodating portion 50 and moves in the direction of the spool valve 200 (the direction AD side) along the central axis AX. At this time, the plunger 30 moves against the urging force of the spring 230, and moves to a position where the magnetic attraction force and the urging force of the spring 230 are balanced. As a result, the communication state and the opening area of the oil port 214 are adjusted, and the oil pressure is output according to the current value flowing through the coil 20. As the current flowing through the coil 20 increases, the magnetic flux density of the magnetic circuit C1 increases, and the magnetic attraction force by the shaft accommodating portion 50 increases, so that the amount of movement of the plunger 30 increases. When the tip surface 32 of the plunger 30 and the stopper 52 come into contact with each other, the plunger 30 does not move any further. The state shown in FIGS. 1 and 2 is a state in which the coil 20 is not energized and a magnetic circuit is not formed, and the plunger 30 is in contact with the bottom portion 14 of the container 10. In FIG. 2, for convenience of explanation, the magnetic circuit C1 formed when the coil 20 is energized is schematically shown by a thick line arrow.

In the present embodiment, the container 10, the ring core 80, the plunger 30, and the stator core 40 are each composed of iron, which is a magnetic material, but they are not limited to iron, and may be composed of any magnetic substance such as nickel and cobalt. In the present embodiment, the container 10 is formed by press molding and the stator core 40 is formed by forging, but each may be formed by any molding method.

Figure 3:
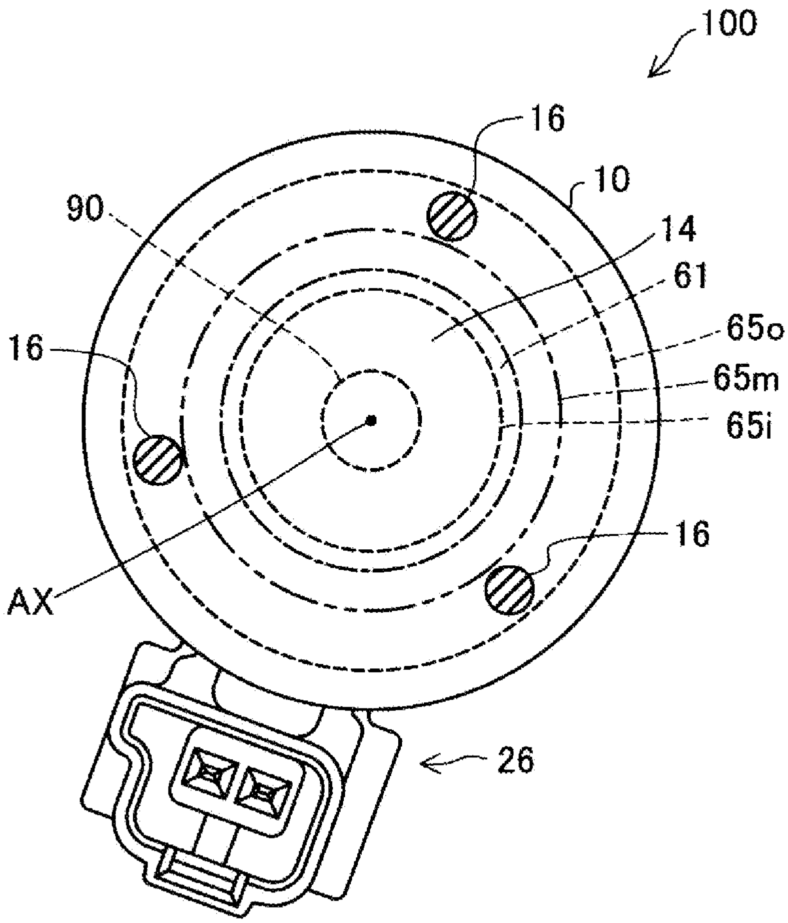
FIG. 3 is a view of the solenoid as viewed from a bottom surface side of the container.

As shown in FIGS. 2 and 3, the bottom portion 14 of the solenoid 100 is welded to the flange portion 65 of the plunger accommodating portion 60 by laser spot welding by laser irradiation to form the welded portion 16. In this embodiment, there are three welded points. These three welded points may be evenly arranged around the central axis AX, but may be unevenly arranged. For example, when the air vent groove in the direction perpendicular to the central axis AX is formed on the surface of the flange portion 65 on the bottom portion 14 side, the welded portion 16 is unevenly arranged for avoiding the air vent groove. In FIG. 3, the portions melted by the laser irradiation are shown as the welded portions 16, but since the molten metal has a continuous composition with the bottom portion 14 and the flange portion 65, the illustration in FIG. 3 is schematic.

In the first embodiment, the bottom portion 14 of the container 10 and the flange portion 65 of the stator core 40 are fixed by welding. Therefore, an elastic member that presses the flange portion 65 against the bottom portion 14 and a space for accommodating the elastic member are not required. When the magnetic flux flows from the bottom portion 14 through the flange portion 65 to the plunger 30, if the magnetic flux passes through a space in which the magnetic flux is difficult to pass, the magnetic efficiency is lowered. However, in the present embodiment, the magnetic flux does not pass through the space where the magnetic flux is difficult to pass, but passes through the magnetic material, so that the magnetic efficiency can be improved. Here, the magnetic efficiency is defined by the attractive force with respect to the magnitude of the magnetic flux received when the shaft accommodating portion 50 receiving the magnetic flux attracts the plunger 30. That is, even if the magnitude of the magnetic flux is the same, if the shaft accommodating portion 50 can attract the plunger 30 more strongly, it is determined that the magnetic efficiency is good.

In the first embodiment, since the bottom portion 14 of the container 10 and the flange portion 65 of the stator core 40 are spot welded, they can be welded in a short time and distortion due to welding can be less likely to occur.

In the first embodiment, it is preferable that the welded portion 16 is formed on the outer peripheral side of an intermediate position 65*m* between an inner peripheral 65*i* and an outer peripheral 65*o* of the flange portion 65. During welding, spatter such as slag and metal particles occurs. When the welded portion 16, that is, the welded position is on the outer peripheral side of the intermediate position 65*m* between the inner peripheral 65*i* and the outer peripheral 65*o* of the flange portion 65, the spatter generated during welding can be suppressed from flying into the space between the plunger 30 and the bottom portion 14 of the container 10.

Second Embodiment

Figure 4:
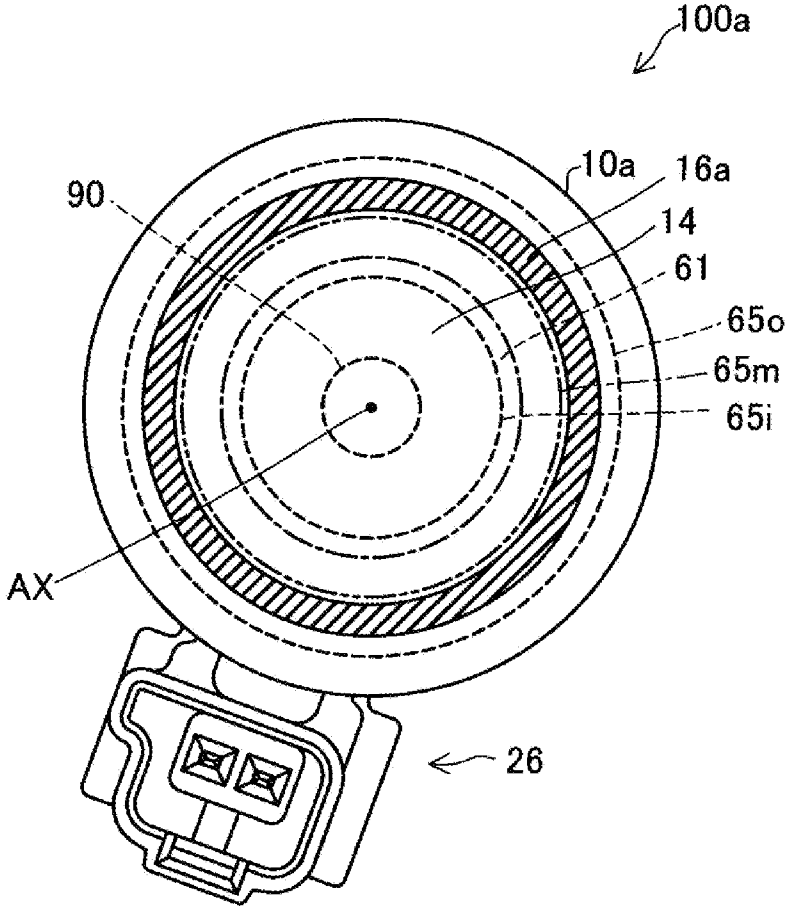
FIG. 4 is a view of the solenoid of a second embodiment as viewed from the bottom surface side of the container.

In the solenoid 100*a* of a second embodiment shown in FIG. 4, the welded portion 16*a* is formed all around the circumference along the circumference centered on the central axis AX. In the solenoid 100*a*, the bottom portion 14 and the flange portion 65 are welded to one circumference along the circumference centered on the central axis AX. Therefore, in this respect, it is different from the solenoid 100 of the first embodiment, in which the three welded portions 16 are spot-welded. The solenoid 100*a* of the second embodiment and the solenoid 100 of the first embodiment have the same configuration other than the welded position.

Also in the second embodiment, as in the first embodiment, the bottom portion 14 of the container 10 and the flange portion 65 of the stator core 40 are fixed by welding. Therefore, an elastic member that presses the flange portion 65 against the bottom portion 14 and a space for accommodating the elastic member are not required. When the magnetic flux flows from the bottom portion 14 through the flange portion 65 to the plunger 30, if the magnetic flux passes through a space in which the magnetic flux is difficult to pass, the magnetic efficiency is lowered. However, in the present embodiment, the magnetic flux does not pass through the space where the magnetic flux is difficult to pass, but passes through the magnetic material, so that the magnetic efficiency can be improved.

In the second embodiment, the bottom portion 14 of the container 10 and the flange portion 65 of the stator core 40 are welded all around the circumference along the circumference centered on the central axis AX, so that the welding strength is increased.

In the second embodiment, as in the first embodiment, it is preferable that the welded portion 16*a* is formed on the outer peripheral side of an intermediate position 65*m* between an inner peripheral 65*i* and an outer peripheral 65*o* of the flange portion 65. During welding, spatter such as slag and metal particles occurs. When the welded portion 16*a*, that is, the welded position is on the outer peripheral side of the intermediate position 65*m* between the inner peripheral 65*i* and the outer peripheral 65*o* of the flange portion 65, the spatter generated during welding can be suppressed from flying into the space between the plunger 30 and the bottom portion 14 of the container 10.

In the second embodiment, the welded portion 16*a* is formed all around the circumference along the circumference centered on the central axis AX. However, when the air vent groove in the direction perpendicular to the central axis AX is formed on the surface of the flange portion 65 on the bottom portion 14 side, the welded portion 16*a* may be formed so as to avoid the air vent groove. That is, even if the welded portion 16*a* is not formed all around the circumference along the circumference centered on the central axis AX, it may be formed substantially all around the circumference.

Although description will be omitted from the third embodiment to be described later, the welding may be spot welding as in the first embodiment, and the welded portion may be formed all around the circumference along the circumference centered on the central axis AX as in the second embodiment. Further, it is preferable that the welded portion is formed on the outer peripheral side of the intermediate position 65*m* between the inner peripheral 65*i* and the outer peripheral 65*o* of the flange portion 65.

Third Embodiment

Figure 5:
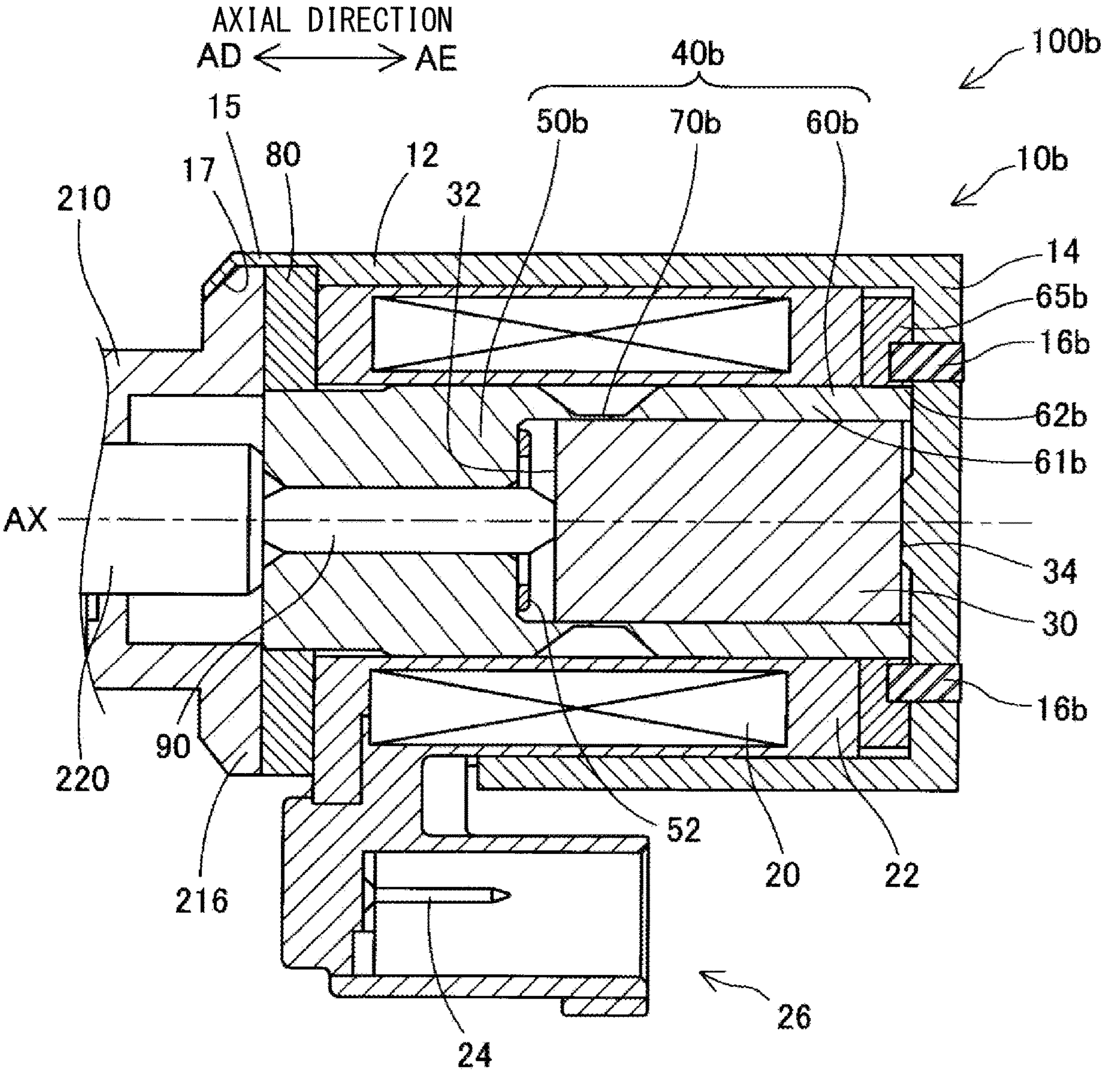
FIG. 5 is a sectional view showing a detailed configuration of the solenoid of a third embodiment.

In the solenoid 100*b* of a third embodiment shown in FIG. 5, the core portion 61*b* and the flange portion 65*b* of the stator core 40 are separate parts, and the flange portion 65*b* is press-fitted into the core portion 61*b*. In this respect, it differs from the solenoid 100 of the first embodiment. Configuration of the solenoid 100*b* of the third embodiment except that the core portion 61*b* and the flange portion 65*b* of the stator core 40 are separate parts, and the flange portion 65*b* is press-fitted into the core portion 61*b* is the same as the solenoid 100 of the first embodiment.

According to the solenoid 100*b* of the third embodiment, the core portion 61*b* and the flange portion 65*b* of the stator core 40*b* are separate parts, and each of them can be manufactured separately. Here, the shape of the core portion 61*b* is a substantially cylindrical shape, and the shape of the flange portion 65*b* is a perforated disk shape, both of which are simple in shape. Therefore, the stator core 40*b* can be easily manufactured by separately manufacturing the core portion 61*b* and the flange portion 65*b* and press-fitting the flange portion 65*b* into the core portion 61*b*.

Fourth Embodiment

Figure 6:
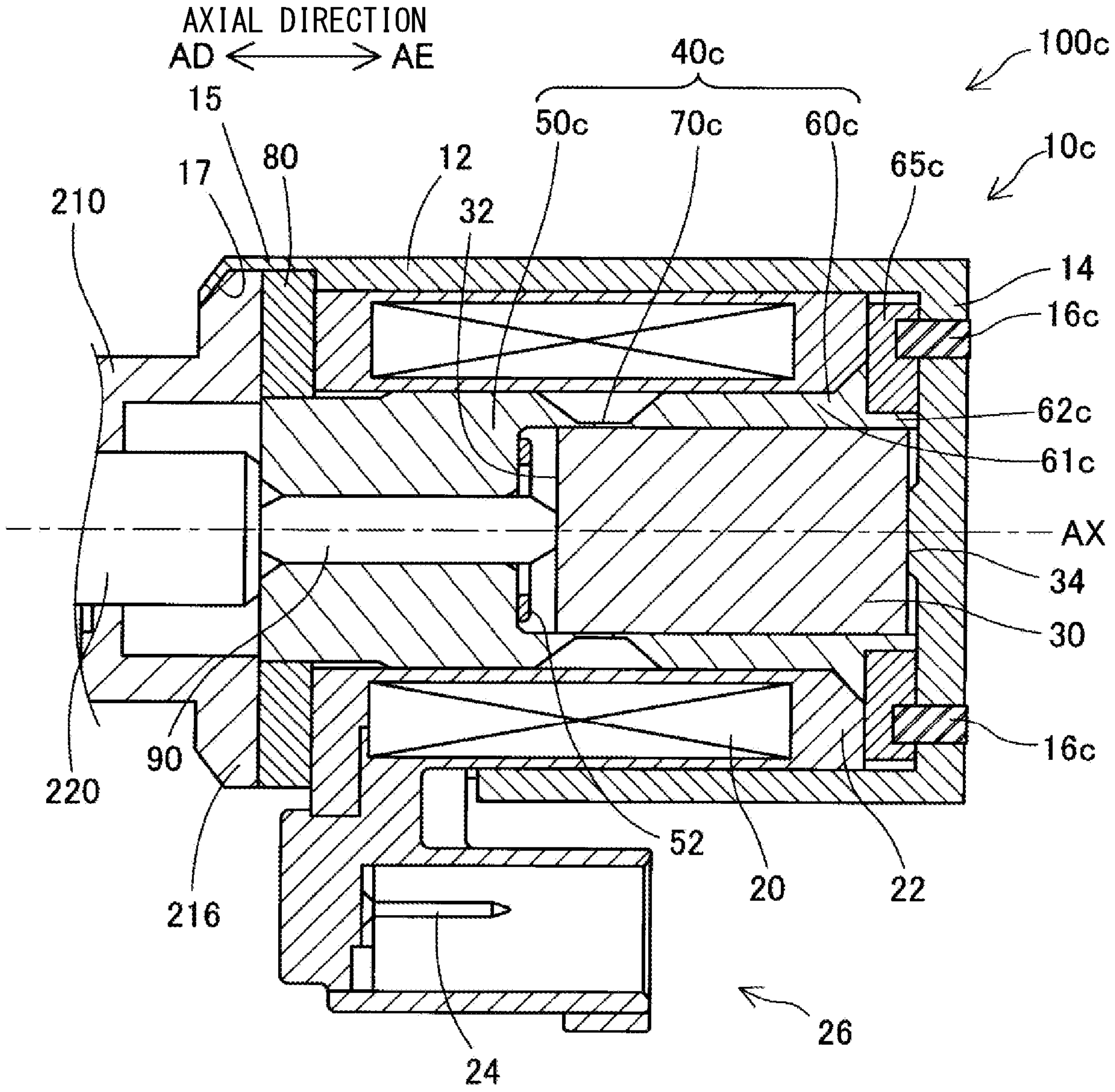
FIG. 6 is a sectional view showing a detailed configuration of a solenoid according to a fourth embodiment.

The solenoid 100*c* of a fourth embodiment shown in FIG. 6 is the same as the solenoid 100*b* of the third embodiment in that the core portion 61*c* and the flange portion 65*c* of the stator core 40 are separate parts. However, in the solenoid 100*b* of the third embodiment, the flange portion 65*b* is press-fitted into the core portion 61*b*, but in the solenoid 100*c* of the fourth embodiment, the flange portion 65*c* is not press-fitted into the core portion 61*c* and is in contact with the core portion 61*c* in the direction along the central axis AX, and is sandwiched between the core portion 61*c* and the bottom portion 14. In this respect, it differs from the solenoid 100*b* of the third embodiment.

According to the solenoid 100*c* of the fourth embodiment, the core portion 61*c* and the flange portion 65*c* of the stator core 40*c* are separate parts, the shape of the core portion 61*c* is a substantially cylindrical shape, and the shape of the flange portion 65*c* is a perforated disk shape. Therefore, both are simple in shape. Therefore, by separately manufacturing the core portion 61*c* and the flange portion 65*c*, the stator core 40*c* can be easily manufactured. Further, in the solenoid 100*c* of the fourth embodiment, since the flange portion 65*c* is not press-fitted into the core portion 61*c*, the manufacturing process can be simplified.

In the solenoid 100*c* of the fourth embodiment, an elastic member is arranged between the stator core 40*c* and the sleeve 210, and the elastic member may press the stator core 40*c* toward the bottom portion 14 along the central axis AX.

Fifth Embodiment

Figure 7:
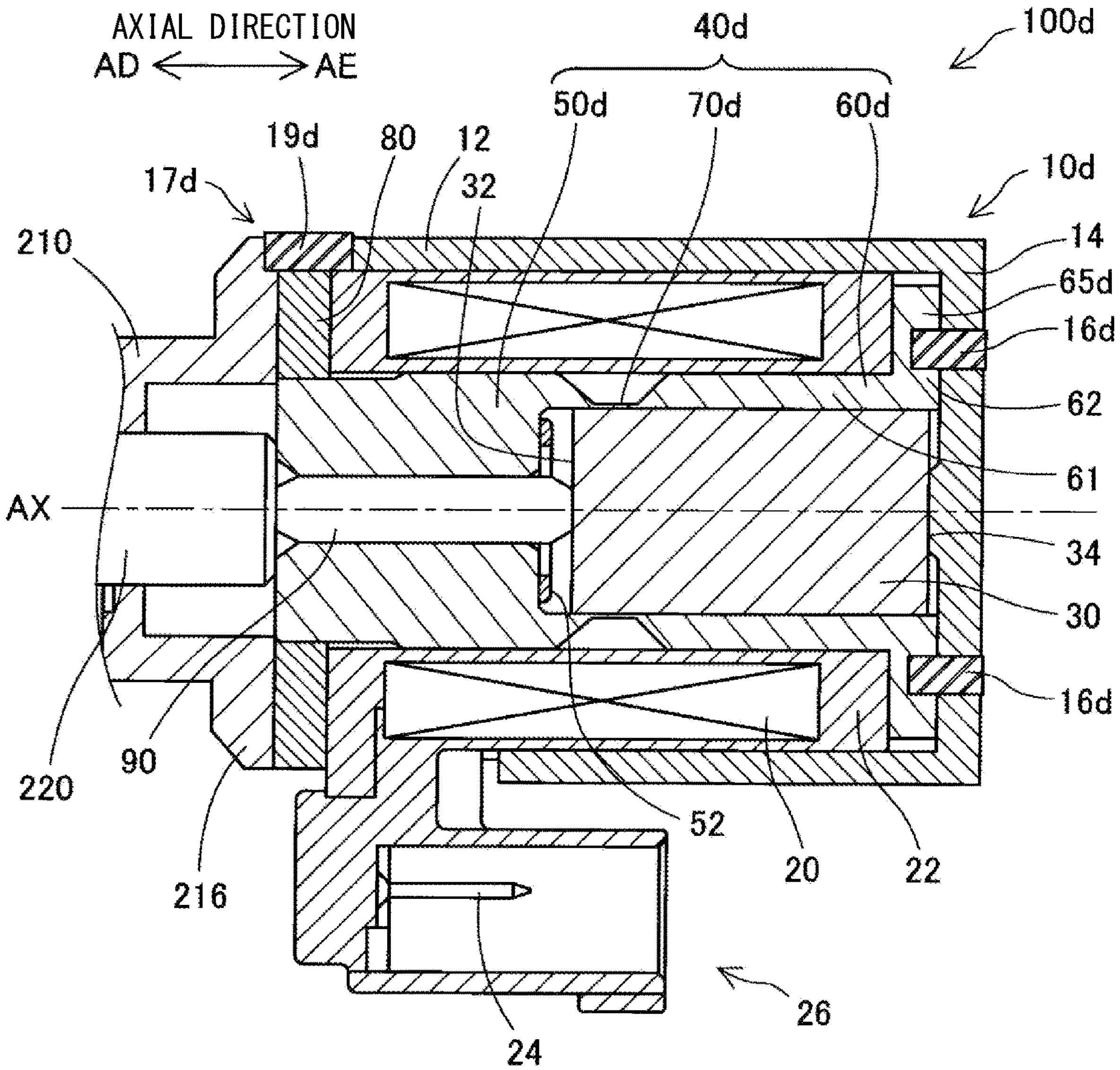
FIG. 7 is a sectional view showing a detailed configuration of a solenoid according to a fifth embodiment.

In the solenoid 100*d* of a fifth embodiment shown in FIG. 7, the container 10*d* does not have the thin-walled portion 15, and is welded to the ring core 80 at the opening portion 17*d* of the container 10*d* to form the welded portion 19*d*. Therefore, in this respect, it is different from the solenoid 100 of the first embodiment. Regarding other configurations, the solenoid 100*d* of the fifth embodiment and the solenoid 100 of the first embodiment are the same.

When manufacturing the solenoid 100*d*, the ring core 80 is fixed after welding the bottom portion 14 of the container 10*d* and the flange portion 65*d* of the stator core 40. According to the solenoid 100*d* of the fifth embodiment, since the container 10*d* and the ring core 80 are fixed by welding, the stress applied to the previously welded portion 16*d* can be reduced in comparison with the case where the ring core 80 is fixed by caulking the opening portion 17 of the container 10. Further, as compared with the case where the opening portion 17 of the container 10 is caulked to fix the ring core 80, the gap between the ring core and the core stator does not need to be widened, so that the size of the coil 20 and the current driving the coil 20 can be reduced without lowering the magnetic efficiency.

Sixth Embodiment

Figure 8:
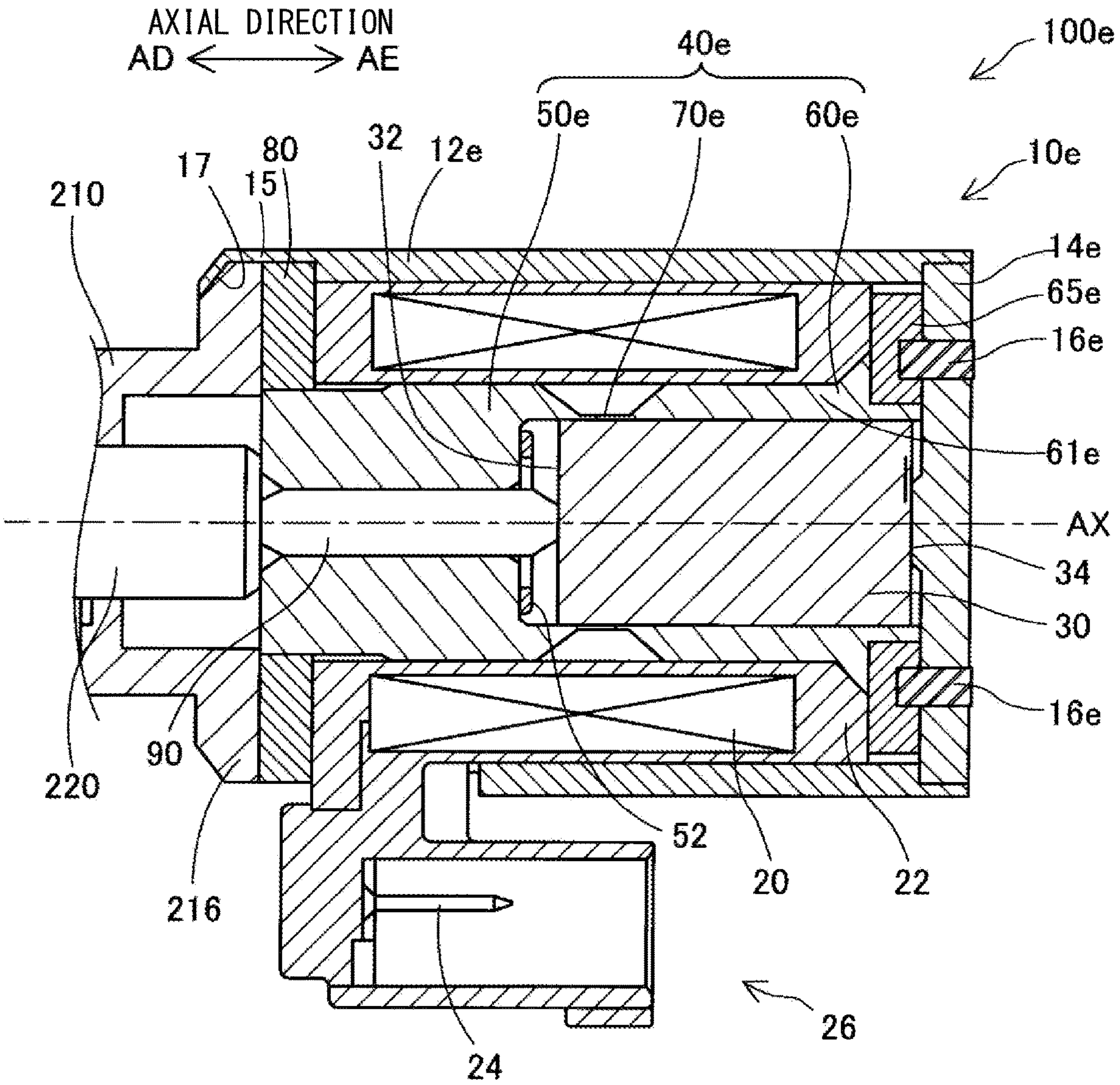
FIG. 8 is a sectional view showing a detailed configuration of a solenoid according to a sixth embodiment.

In the solenoid 100*e* of a sixth embodiment shown in FIG. 8, the bottom portion 14*e* of the container 10*e* is separate from the side surface portion 12*e*. In this respect, it is different from the solenoid 100 of the first embodiment. Regarding other configurations, the solenoid 100*e* of the sixth embodiment and the solenoid 100 of the first embodiment are the same. The bottom portion 14*e* is press-fitted into the side surface portion 12*e*.

According to the solenoid 100*e* of the sixth embodiment, the side surface portion 12*e* and the bottom portion 14*e* of the container 10*e* are separate parts, the shape of the side surface portion 12*e* is a substantially cylindrical shape, and the shape of the bottom portion 14*e* is a disk shape. Therefore, both are simple in shape. Therefore, the core portion 61*e* and the flange portion 65*e* can be manufactured separately, and the container 10*e* can be easily manufactured by press-fitting the bottom portion 14*e* into the side surface portion 12*e*. In the sixth embodiment, the bottom portion 14*e* is press-fitted into the side surface portion 12*e*, but the side surface portion 12*e* may be caulked and fixed to the bottom portion 14*e*.

Seventh Embodiment

Figure 9:
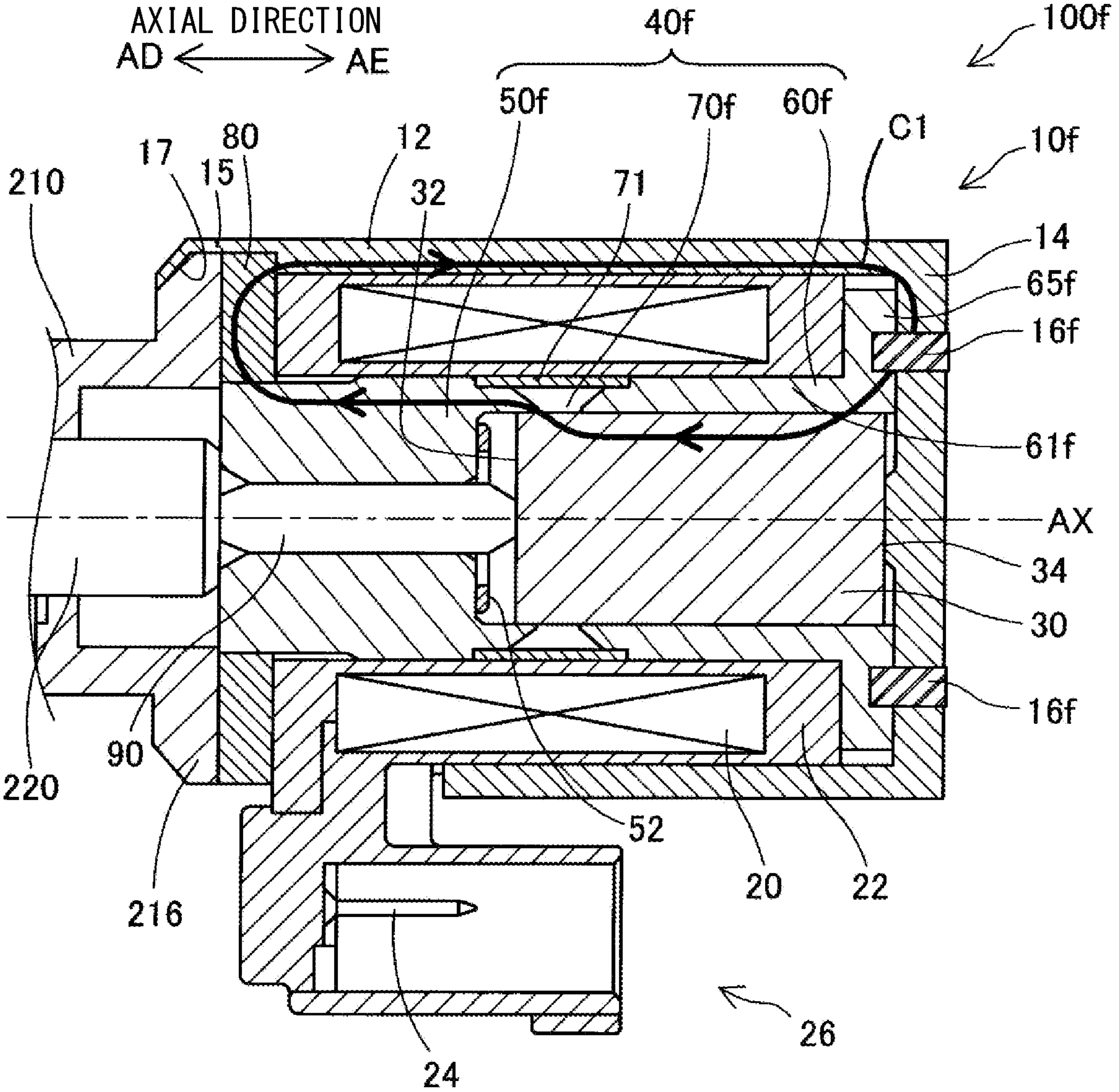
FIG. 9 is a sectional view showing a detailed configuration of a solenoid according to a seventh embodiment.

In the solenoid 100*f* of a seventh embodiment shown in FIG. 9, the shaft accommodating portion 50*f* of the stator core 40*f* and the plunger accommodating portion 60*f* are separate parts, and the shaft accommodating portion 50*f* and the plunger accommodating portion 60*f* are connected by a non-magnetic bridge member 71. In this respect, it differs from the solenoid 100 of the first embodiment.

According to the solenoid 100*f* of the seventh embodiment, since the shaft accommodating portion 50*f* and the plunger accommodating portion 60*f* are separated, the magnetic flux does not flow directly from the plunger accommodating portion 60*f* to the shaft accommodating portion 50*f* and flows from the plunger accommodating portion 60*f* to the shaft accommodating portion 50*f* via the plunger 30. As a result, more magnetic flux passes through the plunger 30, so that magnetic efficiency can be improved.

Eighth Embodiment

Figure 10:
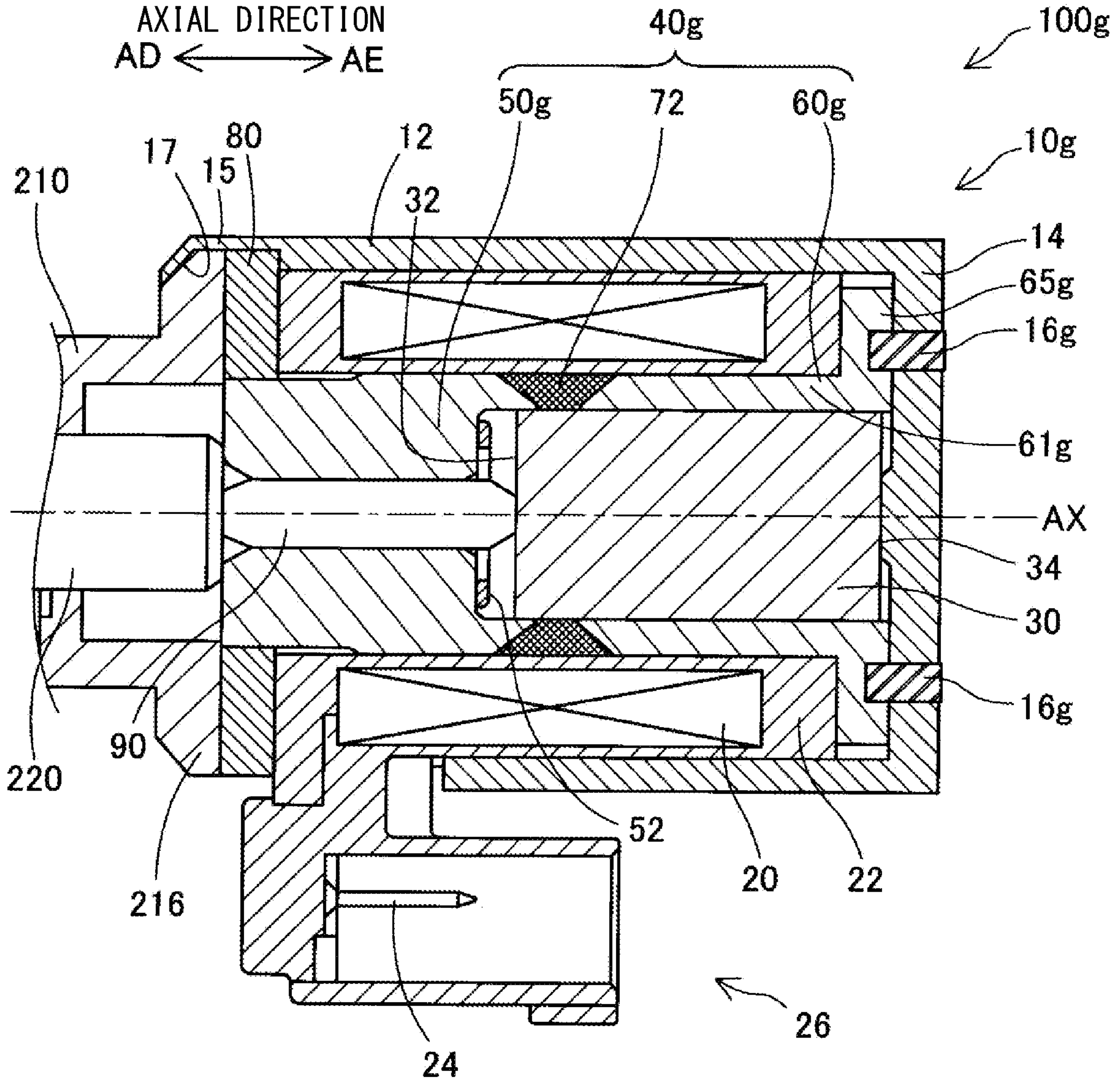
FIG. 10 is a sectional view showing a detailed configuration of a solenoid according to an eighth embodiment.

In the solenoid 100*g* of the eighth embodiment shown in FIG. 10, the shaft accommodating portion 50*g* of the stator core 40*g* and the plunger accommodating portion 60*g* are separate parts, and a space between the shaft accommodating portion 50*f* and the plunger accommodating portion 60*f* is filled with a non-magnetic bridge member 72. In this respect, it differs from the solenoid 100 of the first embodiment.

According to the solenoid 100*g* of the seventh embodiment, since the shaft accommodating portion 50*g* and the plunger accommodating portion 60*g* are separated, the magnetic flux does not flow directly from the plunger accommodating portion 60*g* to the shaft accommodating portion 50*g* and flows from the plunger accommodating portion 60*g* to the shaft accommodating portion 50*g* via the plunger 30. As a result, more magnetic flux passes through the plunger 30, so that magnetic efficiency can be improved.

Ninth Embodiment

Figure 11:
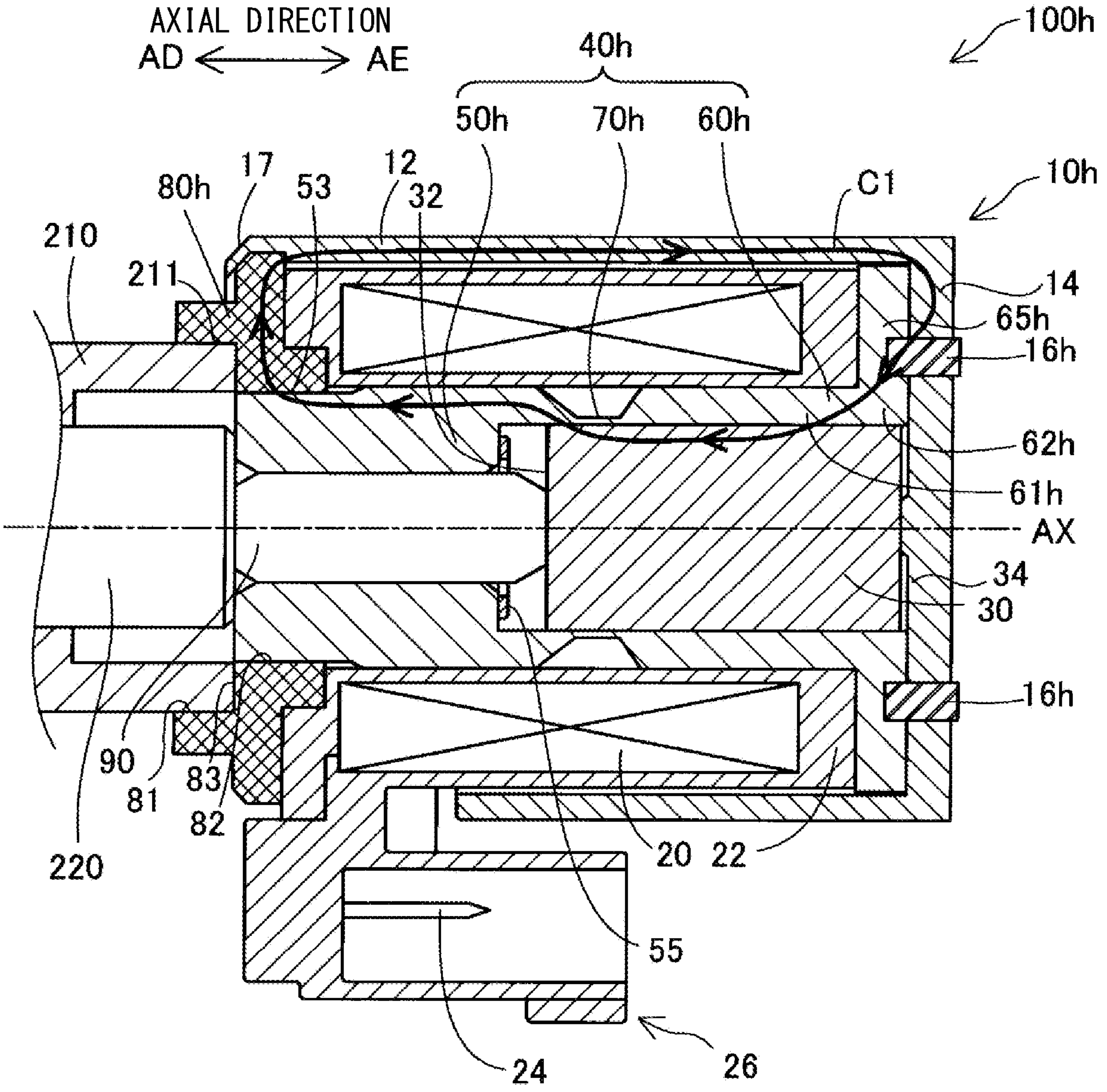
FIG. 11 is a sectional view showing a detailed configuration of a solenoid according to a ninth embodiment.

The solenoid 100*h* of a ninth embodiment shown in FIG. 11 is different from the solenoid 100 of the first embodiment in that the shape of the ring core 80*h* is different. The ring core 80*h* is a substantially cylindrical magnetic material member, fastened to the first outer peripheral surface 211 of the sleeve 210, arranged on the radial outside of the shaft accommodating portion 50, and abuts on the container 10 inside the container 10. In the present embodiment, the ring core 80*h* includes a first inner diameter part 81, a second inner diameter part 82 having an inner diameter smaller than that of the first inner diameter part 81, and a connecting surface 83 that connects the first inner diameter part 81 and the second inner diameter part 82 and is substantially parallel to the radial direction. In the present embodiment, the connecting surface 83 faces the end surface of the sleeve 210 on the spool valve 200 side on the direction AE side. In the present embodiment, the ring core 80*h* is press-fitted and fastened to the first outer peripheral surface 211 at the first inner diameter part 81. Further, the ring core 80*h* is fitted to a second outer peripheral surface 53 at a second inner diameter part 82. Further, in the present embodiment, the ring core 80*h* is in contact with the side surface portion 12 of the container 10 on the solenoid 100 side on the radial outer side and the direction AE side.

According to the solenoid 100*h* of the ninth embodiment, a contact area between the ring core 80*h* and the shaft accommodating portion 50*h* can be increased, so that the magnetic flux can be easily transferred between the shaft accommodating portion 50*h* of the stator core 40*h* and the side surface portion 12 of the container 10.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. A solenoid that drives a shaft in a direction along a central axis, comprising:
- a coil configured to generate magnetic flux;
- a magnetic container configured to accommodate the coil, that has a side surface portion and a bottom portion, and the side surface portion and a part of the bottom portion act as a yoke through which the magnetic flux passes;
- a plunger arranged inside the coil and configured to slide in a direction along the central axis to move the shaft;
- a stator core made of a magnetic material including
  - a plunger accommodating portion having a cylindrical core portion configured to accommodate the plunger inside, a flange portion provided radially outward at an end of the core portion on the bottom portion side and welded to the bottom portion of the container by at least one weld portion, and
  - a shaft accommodating portion configured to accommodate the shaft an attract the plunger by an action of the magnetic flux; and
- a ring core provided on an opposite side of the shaft accommodating portion to the plunger accommodating portion;
- wherein the weld portion passes through a surface of the flange that faces a surface of the bottom portion of the container.

2. The solenoid according to claim 1, wherein
- the weld portion is formed by a spot weld.

3. The solenoid according to claim 1, wherein
- the bottom portion and the flange portion are welded around a circumference along the circumference centered on the central axis.

4. The solenoid according to claim 1, wherein
- the bottom portion and the flange portion are welded on an outer peripheral side of an intermediate position between an inner peripheral and an outer peripheral of the flange portion.

5. The solenoid according to claim 1, wherein
- the flange portion is a separate part separated from the core portion and is press-fitted into the core portion.

6. The solenoid according to claim 1, wherein
- the flange portion is a separate part separated from the core portion, and
- the flange portion is in contact with the core portion in a direction along the central axis, and is sandwiched between the coil and the bottom portion.

7. The solenoid according to claim 1, wherein
- the ring core and the yoke are welded together.

8. The solenoid according to claim 1, wherein
- the bottom portion is formed separately from the side surface portion and is press-fitted or caulked to the side surface portion.

9. The solenoid according to claim 1, wherein
- a thin-walled portion is provided between the plunger accommodating portion and the shaft accommodating portion.

10. The solenoid according to claim 1, wherein
- the shaft accommodating portion and the plunger accommodating portion are separate parts, and
- the shaft accommodating portion and the plunger accommodating portion are bridged by a non-magnetic material.

11. The solenoid according to claim 1, wherein the cylindrical core portion and the flange portion are integrally formed.

12. The solenoid according to claim 1, wherein the at least one weld portion includes a plurality of weld portions each of which passes through the surface of the flange that faces the surface of the bottom portion of the container.

13. The solenoid according to claim 12, wherein:
- the plurality of weld portions includes three weld portions each of which passes through the surface of the flange that faces the surface of the bottom portion of the container; and
- the three weld portions are evenly arranged around the central axis.

14. The solenoid according to claim 1, wherein:
- a stopper is arranged on a surface of the shaft accommodating portion facing an end surface of the plunger, and
- the stopper is configured to suppress a direct contact between the plunger and the shaft accommodating portion.

15. The solenoid according to claim 14, wherein the stopper is made of a non-magnetic material.

16. The solenoid according to claim 1, wherein the ring core is configured to be displaceable in a radial direction which is perpendicular to the central axis.

17. The solenoid according to claim 1, wherein the shaft accommodating portion is fitted to the ring core with a slight radial gap.

* * * * *